July 7, 1970 R. SMITH 3,519,850

DIFFERENTIAL SENSE AMPLIFIER AND DETECTOR CIRCUIT

Filed Oct. 11, 1967

INVENTOR
ROBERT SMITH

BY John W Girvin, Jr
ATTORNEY

3,519,850
DIFFERENTIAL SENSE AMPLIFIER AND DETECTOR CIRCUIT

Robert Smith, Raleigh, N.C., assignor to International Business Machines Corporation, Armonk, N.Y., a corporation of New York Filed Oct. 11, 1967, Ser. No. 674,470
Int. Cl. H03f *1/00;* H03k *5/20*
U.S. Cl. 307—235 3 Claims

ABSTRACT OF THE DISCLOSURE

A circuit for detecting a predetermined amplitude theshold of a bipolar signal comprising a transistorized differential amplifier having two series-connected resistors in the collector circuits of each transistor of the amplifier allowing two output signals proportional to one another to be derived from each collector. Two detector circuits, each comprising two emitter coupled transistors are connected to the collector circuits of the differential amplifier. One transistor of each pair is connected between the split resistors of one of the differential amplifier collector circuits, and the other transistor is connected directly to the collector circuit of the other transistor of the differential amplifier. A detection threshold is thus established by offsetting the collector voltages and comparing the total positive and negative swing to it.

BRIEF BACKGROUND OF INVENTION

Field

This invention relates to an improved amplifier circuit and, more particularly, to an improved sense amplifier circuit for detecting the output of a magnetic storage device wherein temperature stability, noise rejection, and a closely controlled threshold detection level are important requirements.

Description of prior art

The present sense amplifier is designed for use in the detection of small signals in a noisy environment such as a magnetic storage device utilized in conjunction with a data processing system. In such an environment, it is mandatory that the amplifier be highly reliable in detecting signals which exceed a predetermined amplitude threshold value and in rejecting spurious noise signals which may occur at the input of the sense amplifier. Such a sense amplifier must also be temperature stable, the threshold level of detection remaining the same regardless of changes in the ambient temperature.

The prior art sense amplifiers fall into two general categories. One type of sense amplifier utilizes precision components with closely controlled voltage sources and finely tuned temperature compensators consisting of many components. These devices insure that the threshold level, that is, the voltage level at which detection occurs, remains constant with temperature and voltage variation. A second prior art approach has been to utilize a detection scheme wherein the ratio of resistor components to one another determines the threshold level. A change in ambient temperature and voltage variations of supply voltages thus have minute or no effect upon the threshold voltage level. However, in order to achieve an operable circuit of this nature, the prior art utilizes only one-half of the differential voltage swing of the input signal to detect the signal. Hence, this circuit can only be utilized for detecting relatively large magnitude signals.

SUMMARY

In order to overcome the above problems of the prior art and provide a differential sense amplifier having a precise threshold voltage of minimal level, and yet be capable of compensating for supply voltage and temperature variations without necessitating special temperature and voltage control circuits, the differential sense amplifier of the present invention is provided with novel circuitry including a differential amplifier and two detector circuits.

The differential amplifier is provided with two series connected resistors in the collector circuits of each of the transistors of the differential amplifier. Capacitor coupling of the emitter resistors permits the use of unbalanced transistors in the balanced differential amplifier so that in its quiescent state, approximately the same current flows through each collector circuit. Output signals are derived at the point between the split resistors of each collector circuit and also at the collector electrodes of each collector circuit thereby providing four output signals.

Two detector circuits, each comprising two transistors connected in common emitter configuration are responsive to the output signals of the differential amplifier. These detector circuits are connected so that the threshold level of the sense amplifier is based upon the ratio of the resistors of the collector circuits of the differential amplifier. The complete differential gain of the amplifier is used inasmuch as the threshold is set up by offsetting the collector voltages of the amplifier and then comparing the total positive and negative swing to it by means of the detector circuits. Since the threshold level is dependent upon a ratio of resistors, it is not sensitive to supply voltage variations and changes in the ambient temperature. Also, since both the positive and negative voltage swing of the input signal is utilized, minimum detection levels can be utlized.

The foregoing and other features and advantages of the invention will be apparent from the following more particular description of the preferred embodiment of the invention as illustrated in the accompanying drawings.

Figure 1:
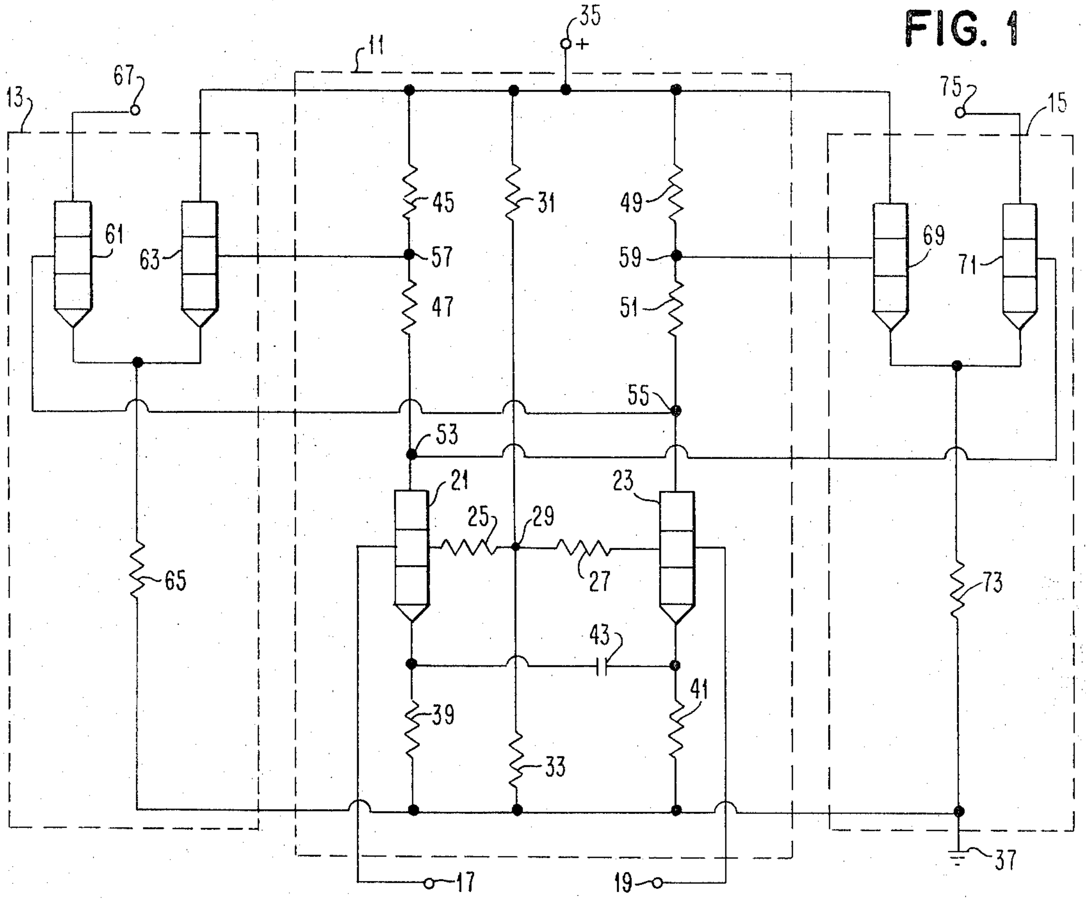
FIG. 1 is a schematic circuit diagram of a differential sense amplifier and detector circuit according to the invention.

Referring now to FIG. 1, a schematic circuit diagram of a differential sense amplifier and detector circuit according to the present invention is depicted. This circuit comprises a differential amplifier 11, a first detector circuit 13 and a second detector circuit 15. Bipolar output signals from a memory core sense winding (not shown) or the like is applied to input terminals 17 and 19 of the differential amplifier 11. From the input terminals 17 and 19, the bipolar signals are applied to the base electrodes of transistors 21 and 23, which are connected via resistors 25 and 27 to a point of reference potential 29. The voltage potential at the point of reference potential 29 is determined by the voltage divider network formed by resistors 31 and 33 connected between a source of positive potential represented by terminal 35 and ground potential represented by terminal 37. The emitter electrodes of transistors 21 and 23 are connected via resistors 39 and 41 respectively to terminal 37. Capactitor 43 is connected between the emitter electrodes of the transistors 21 and 23 to provide DC isolation.

The collector electrodes of transistors 21 and 23 are connected to terminal 35 representing a source of positive potential through resistors 45 and 47 and resistors 49 and 51 respectively. The resistors of each collector circuit are split, as will be described hereinafter, in order to provide two output signals to each detector circuit 13 and 15. One output signal is derived at the collector electrodes 53 and 55 of each transistor and the other is derived across the split resistors at points 57 and 59 of each collector circuit.

The values of resistors 45 and 49 are approximately equal, as are the values of resistors 47 and 51. Resistors 39 and 41 in the emitter circuits of the transistors are also approximately equal thereby insuring, in the quiescent, state, equal collector currents in the collector circuits of transistors 21 and 23. With equal collector currents, the potentials at points 57 and 59 are approximately equal and greater than the potentials at the collector electrodes 53 and 55 which are also approximately equal.

The first detector circuit 13 consists of two transistors 61 and 63 connected in common emitter configuration. The emitter electrodes of the transistors are connected through resistor 65 to terminal 37 representing ground potential. The collector electrode of transistor 63 is connected to terminal 35 representing a positive potential source while the collector electrode of transistor 61 provides an output signal at terminal 67. The base electrodes of transistors 61 and 63 are connected to the collector electrode 55 of transistor 23 and to point 57, respectively.

In a similar manner, the second detector circuit 15 consists of two transistors 69 and 71 connected in a common emitter configuration through resistor 73 to terminal 37. The collector electrode of transistor 69 is connected to terminal 35 and the collector electrode of transistor 71 provides an output signal at terminal 75. The base electrodes of transistors 69 and 71 are connected to point 59 and to the collector electrode 53 of transistor 21, respectively.

Since the potentials at points 57 and 59 are greater than that at the collector electrodes 53 and 55, transistors 63 and 69 are normally biased on and transistors 61 and 71 are normally off. Detection occurs when transistor 61 or transistor 71 turns on thereby providing an output signal at terminal 67 or at terminal 75.

In operation, the differential amplifier 11 operates as a Class A balanced difference amplifier. As discussed above, in their quiescent state, transistors 21 and 23 draw approximately equal collector current. This causes the voltage level at points 57 and 59 to be greater than the voltage level at the collector electrodes 53 and 55 of the transistors 21 and 23, thereby biasing transistors 63 and 69 of detector circuits 13 and 15 respectively into a conducting condition.

When a bipolar output from the magnetic core sense winding appears at terminals 17 and 19, one of the transistors of the differential amplifier 11 will conduct more heavily while the other will conduct less heavily than their quiescent condition. Assuming that the signal appearing at input terminal 17 goes positive with respect to its quiescent condition and that the signal appearing at terminal 19 goes negative with respect to its quiescent condition, transistor 21 will conduct more heavily while transistor 23 will conduct less heavily. This will result in an increase in collector current in transistor 21 and a decrease in collector current in transistor 23. The increased collector current of transistor 21 lowers the voltage at point 57 since the voltage at that point is equal to the supply voltage less the voltage drop across resistor 45 which is a direct function of the collector current. Additionally, the voltage at the collector electrode 55 of transistor 23 increases as the collector current of transistor 23 decreases. When the voltage at the collector electrode 55 is approximately equal to that at point 57, transistor 61 is driven into conduction and thereby provides an output signal at terminal 67. Thus, an output signal is provided by the first detector circuit 13. At the same time that the first detector circuit 13 is placed in the operate condition, the second detector circuit 15 is driven more into a non-detect condition since the voltage at the collector electrode 53 of transistor 21 decreases while the voltage at point 59 increases thereby driving transistor 69 further into a conducting state and thereby biasing transistor 71 further off.

When the bipolar signal appearing at input terminals 17 and 19 is such that a positive going signal with respect to the quiescent condition appears at terminal 19 while a negative going signal appears at terminal 17, the second detector circuit 15 will be placed in an operate condition while the first detector circuit 13 will be driven more into a non-detect condition. This operation is similar to that described above with respect to detection occurring at the first detector circuit 13 and non-detection at the second detector circuit 15.

In summary, the first detector circuit 13 will operate on either a rising signal at input terminal 17 or a decreasing signal at input terminal 19. The second detector circuit 15 will operate on either a rising signal at input terminal 19 or a decreasing signal at input terminal 17. Thus, it can be seen, that by dividing the collector resistors of the differential amplifier 11 to form more than one reference point in each collector circuit, a comparison can be made between the two collector currents to bring about a threshold condition indicative of an input signal of a desired magnitude. The threshold magnitude is solely dependent upon the ratio of the resistors 45, 47, 49, and 51.

Figure 2:
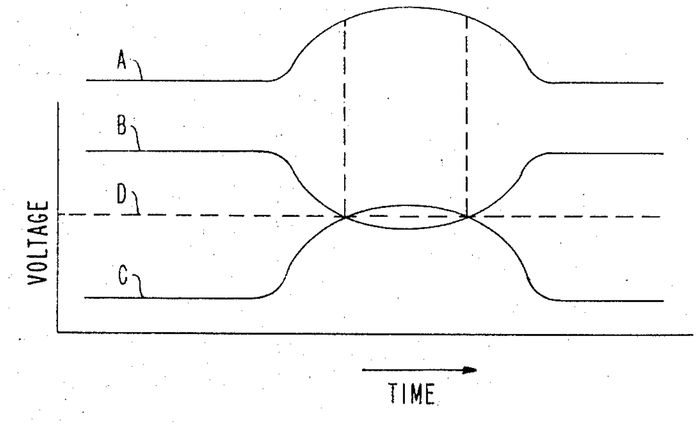
FIG. 2 is a wave form representation of various voltage levels of the circuit of FIG. 1.

Referring now to FIG. 2, wave forms representative of an input signal at terminal 19, the potential at the collector electrode 53 of transistor 21 and the potential at point 59, of the circuit shown in FIG. 1 are depicted. Wave form A depicts a positive going input signal such as that derived from the sense winding of a magnetic core storage device. A signal equal in magnitude but 180 degrees out of phase from wave form A is derived from the same sense winding. These signals are applied to terminals 17 and 19 of the circuit shown in FIG. 1. When the positive going signal depicted as wave form A is applied to terminal 19, transistor 23 is driven further into conduction thereby increasing the collector current of this transistor and decreasing the voltage level at point 59. The wave form at point 59 is depicted as wave form B in FIG. 2. The simultaneous application of an input wave form 180° out of phase with wave form A to terminal 17 causes the collector current of transistor 21 to decrease thereby causing the voltage at collector of electrode 53 to increase and approach the supply voltage at terminal 35. The voltage wave form at collector electrode 53 is depicted by wave form C of FIG. 2. Detection occurs when the voltage at point 59 is equal to the voltage at the collector electrode 53. This detection level is depicted by the dotted line D of FIG. 2 and, as can be readily seen, it is dependent upon the amplitude of the input wave form A.

The circuit of FIG. 1 has been shown to maintain a constant discrimination level of approximately 17 millivolts when the following values of circuit components were used:

Resistors:
- 25—130 ohms
- 27—130 ohms
- 31—1000 ohms
- 33—1200 ohms
- 39—1580 ohms
- 41—1580 ohms
- 45—604 ohms
- 47—301 ohms
- 49—604 ohms
- 51—301 ohms
- 65—2000 ohms
- 73—2000 ohms Capacitor 43—.22 microfarad
Terminal 45 voltage—12 v.
Terminal 37 voltage—Ground In the circuit which has been described, the values of the resistors in one of the collector circuits of the differential amplifier are equal to the values of the resistors in the other collector circuit. Additionally, equal collector current flows and therefore the detection level for both polarities of input signals is the same with this configuration. If different detection levels are desired for the different polarity input signals, the resistors of the two collector circuits can be made unequal.

It is, of course, recognized by those skilled in the art that several different detection schemes can be utilized. For example, the collector electrodes of transistors 61 atnd 71 could be joined together to provide an output signal indicative of a signal of either sense applied to input terminals 17 and 19. Additionally, any detection device 13 which utilizes the offset collector voltages of the differential amplifier 11 to provide an output signal indicative of detection could be utilized. The amplifier could be modified to include balanced transistors and/or a constant current supply in the emitter circuits to thereby insure matched collector currents in the quiescent state.

While the invention has been particularly shown and described with reference to a preferred embodiment thereof, it should be understood by those skilled in the art, that the foregoing and other changes in form and detail may be made therein without departing from the scope of the invention.

What is claimed is:

1. A differential sense amplifier and detector circuit for detecting a pair of oppositely phased bipolar input signals of predetermined magnitude comprising:

a balanced difference amplifier comprising
- two transistors each having emitter, base, and collector electrodes,
- first impedance means associated with each transistor and connected between a first voltage level source and the emitter electrode of its respective transistor and second impedance means associated with each transistor and connected between a second voltage level source and the base electrode of its respective transistor for biasing said transistors into a quiescent state of conductivity,
- means for applying one of said bipolar input signals to the base electrode of one of said transistors and the other bipolar signal to the base electrode of the other of said transistors,
- a split collector resistor associated with each transistor connected between said second voltage level source and the collector electrode of its respective transistor;
- a detector circuit comprising,
- a third detecting transistor and a fourth detecting transistor each having emitter, base, and collector electrodes and connected in common emitter configuration,
- the collector electrode of one of the detecting transistors being connected to a voltage level source,
- the collector electrode of said other detecting transistor providing an output detection signal,
- the base electrode of said third detecting transistor being connected to the collector electrode of one of said two transistors,
- the base electrode of said fourth detecting transistor being connected to a point between the split collector resistors of the other of said two transistors,
- said detecting circuit providing said output detection signal when the voltage levels at the base electrodes of the detecting transistors are approximately equal.

2. The differential sense amplifier and detector circuit set forth in claim 1 further comprising a capacitor connected between the emitter electrodes of said two transistors for providing an A.C. short between said emitter electrodes.

3. The differential sense amplifier and detector circuit set forth in claim 2 wherein said detector circuit further comprises a fifth detecting transistor and a sixth detecting transistor each having emitter, base, and collector electrodes and connected in common emitter configuration,
- the collector electrode of one of said detecting transistors being connected to a voltage level source,
- the collector electrode of said other detecting transistor providing an output detection signal,
- the base electrode of said fifth detecting transistor being connected to the collector electrode of said other of said two transistors,
- the base electrode of said sixth detecting transistor being connected to a point between the split collector resistors of said one of said two transistors, said detecting circuit providing said output detection signals when the voltage levels at the base electrodes of the detecting transistors are approximately equal.

References Cited

UNITED STATES PATENTS 3,432,688 3/1969 Zola ------------ 330—30 XR

DONALD D. FORRER, Primary Examiner

J. ZAZWORSKY, Assistant Examiner

U.S. Cl. X.R.

307—229; 330—30